United States Patent [19]

Reichmann

[11] Patent Number: 4,797,428
[45] Date of Patent: Jan. 10, 1989

[54] FOAM SYSTEMS AND ASTM E-84 CLASS 1 RATED FOAMS PRODUCED THEREFROM

[75] Inventor: Wolfgang W. Reichmann, Pittsburgh, Pa.

[73] Assignee: Mobay Corporation, Pittsburgh, Pa.

[21] Appl. No.: 65,228

[22] Filed: Jun. 22, 1987

[51] Int. Cl.[4] ............................................. C08G 18/42
[52] U.S. Cl. ................................... 521/137; 521/138; 521/139; 521/140; 521/147; 521/150; 521/155; 521/157; 521/164; 521/172; 521/174; 521/182; 521/184; 521/906
[58] Field of Search ............... 521/137, 138, 139, 140, 521/147, 150, 155, 157, 164, 172, 174, 182, 184, 906

[56] References Cited

U.S. PATENT DOCUMENTS

| | | | |
|---|---|---|---|
| 3,647,759 | 3/1972 | Walker | 260/75 |
| 3,943,164 | 3/1976 | Brady et al. | 260/475 |
| 4,039,487 | 8/1977 | Kolakowski et al. | 260/2.5 |
| 4,048,104 | 9/1977 | Svoboda et al. | 260/2.5 |
| 4,100,354 | 7/1978 | Owen, Jr. | 560/89 |
| 4,223,068 | 9/1980 | Carlstrom et al. | 428/310 |
| 4,237,238 | 12/1980 | DeGuiseppi et al. | 521/131 |
| 4,246,365 | 1/1981 | Wiedermann et al. | 521/172 |
| 4,346,229 | 8/1982 | Derr et al. | 560/91 |
| 4,394,286 | 7/1983 | Millick, III | 252/182 |
| 4,411,949 | 10/1983 | Snider et al. | 428/304 |
| 4,417,001 | 11/1983 | Svoboda et al. | 521/114 |
| 4,435,592 | 3/1984 | Reichel | 590/91 |
| 4,452,997 | 6/1984 | Marx et al. | 560/200 |
| 4,459,334 | 7/1984 | Blanpied et al. | 428/219 |
| 4,487,853 | 12/1984 | Reichel et al. | 521/172 |
| 4,496,625 | 1/1985 | Snider et al. | 428/318 |
| 4,506,090 | 3/1985 | Brennan et al. | 560/91 |
| 4,521,611 | 6/1985 | Magnus | 560/91 |
| 4,526,908 | 7/1985 | Magnus et al. | 521/172 |
| 4,535,178 | 8/1985 | Reichel | 560/91 |
| 4,544,679 | 10/1985 | Tideswell et al. | 521/116 |
| 4,560,788 | 12/1985 | Miyamoto et al. | 560/91 |
| 4,582,926 | 4/1986 | Straehle et al. | 560/91 |
| 4,604,410 | 8/1986 | Altenberg | 521/172 |

OTHER PUBLICATIONS

The Use of a Unique Aromatic Polyester Polyol in Urethane Modified Isocyanurate Foam Systems, pp. 348-351, R. J. Wood, 1983.
New Polyols For Urethane Modified Isocyanurate Foams, Journal of Cellular Plastics, May-Jun., 1984, K. B. White, pp. 215-219.
Technical Data Bulletin-Firemaster PHT4-Diol.
ASTM Designation: E 84-84 a pp. 315-332.

Primary Examiner—John Kight
Assistant Examiner—S. A. Acquah
Attorney, Agent, or Firm—Gene Harsh; Joseph C. Gil; Richard E. L. Henderson

[57] ABSTRACT

Rigid flame resistant polyurethane foams are made by reacting an aromatic polyisocyanate with a mixture of 25-75% oligoester and another isocyanate-reactive material in the presence of a blowing agent at an NCO index of less than 300. These foams which have an ASTM E-84 Class 1 rating are particularly useful in construction applications.

7 Claims, No Drawings

FOAM SYSTEMS AND ASTM E-84 CLASS 1 RATED FOAMS PRODUCED THEREFROM

BACKGROUND OF THE INVENTION

1. Field of the Invention

The present invention relates to rigid flame resistant polyurethane foams, particularly ASTM E-84 Class 1 rated urethane modified polyisocyanurate foams.

2. Description of the Prior Art

Rigid polyurethane foams are well known and are commonly prepared from organic polyisocyanates and organic polyols together with known blowing agents, surfactants and catalysts for the reaction of —OH and —NCO groups. Such foams are used in construction, refrigeration and insulation applications because they may be prepared in a wide variety of densities and because they are closed cell foams.

A critical factor in large scale commercial acceptance of a foam for the construction industry and related industries is the ASTM E-84 classification of the particular foam. For fire retardant applications, it has been customary to employ halogenated additives and/or halogenated organic polyols. However, several problems result from the substantial amounts of flame retardant which must be used. The most significant of these problems are the reduced dimensional stability and the increased cost of the foam. A strong need for low Smoke and Flamespread polyurethane foams which do not have these disadvantages therefore exists.

In order to improve the ASTM E-84 performance of foams, aromatic polyester polyols have been used in the production of polyurethane foams and urethane modified polyisocyanurate foams. The use of such polyester polyols is described, for example, in U.S. Pat. Nos. 2,246,365 and 4,039,487. U.S. Pat. No. 4,246,365 teaches that the fire resistance of polyisocyanurate foams can be improved by using polyester polyols based on phthalic acid residues. U.S. Pat. No. 4,039,487 teaches a wide variety of aromatic polyester polyols which are said to produce foams with good ASTM E-84 performance. However, the improvement is limited to the entire foam composite (i.e. foam and surface layer) in which the foam has high friability and low density and thickness.

In an article entitled "The Use of a Unique Aromatic Polyester Polyol in Urethane Modified Isocyanurate Foam Systems" (SPI ANTC, pages 348–351, R. J. Wood, 1983), the use of aromatic polyester polyols combined with various polyethers, solubilizers and relatively low viscosity polyisocyanates is described.

The use of aromatic polyester polyols in combination with sucrose or sucrose-amine based polyethers and low viscosity polyisocyanates is disclosed in U.S. Pat. Nos. 4,459,334 and 4,496,625, and in "New Polyols for Urethane Modified Isocyanurate Foams" (Journal of Cellular Plastics, May-June, 1984, K. B. White et al, pages 215–219). Polyester polyols which are based on aromatic acids, diethylene glycol and propylene glycol are known (See e.g., Technical Data Bulletin-Firemaster PHT4-diol.)

Oligoesters are also known in the art and are described, for example in U.S. Pat. Nos. 3,943,164; 4,435,592; 4,452,997; 4,487,853; 4,535,178; 4,560,788 and 4,582,926. However, no specific advantages with respect to flame retardancy are attributed to them in these disclosures.

Polyester polyols which are the reaction products of polyalkylene terephthalate or recycled polyethylene terephthalate (PET) or dimethyl terephthalate (DMT) with various glycols or glycol blends are also known. Such polyols are disclosed in U.S. Pat. Nos. 4,048,104; 4,223,068; 4,100,354; 4,506,090; 4,436,229 and 4,411,949. Systems based on those polyester polyols which are produced by reacting a polyalkylene terephthalate residue (PET) with glycol (U.S. Pat. No. 4,417,001) and transesterified dimethylterephthalate oxidation residue (U.S. Pat. Nos. 4,237,238; 4,394,286 and 3,647,759) are also known. Polyurethane foams prepared using such polyester polyols exhibit lower Flamespread and Smoke generation ratings than corresponding foams prepared without such polyols when evaluated in accordance with ASTM E-84.

Urethane modified polyisocyanurate foams made from polyester-containing polyol blends in which the fire retardance performance is acceptable only at a density of about 2 pounds per cubic foot or below are described in U.S. Pat. Nos. 4,521,611; 4,526,908 and 4,544,679.

Rigid foams made from etherified modified scrap polyalkylene terephthalate polymers are disclosed in U.S. Pat. No. 4,604,410. However, it is clear from the exemplified foams that when tested in accordance with ASTM E-84, the disclosed foams had Flamespread values of greater than 25. That is, the foams did not satisfy the requirements of a Class 1 foam.

The prior art described above indicates that progress in the development of flame retardant polyurethane and urethane modified polyisocyanurate foams has been made. However, the optimal foam systems with respect to processability, physical and insulation properties, thermal and fire performance properties have not yet been found.

The development of polyurethane and urethane modified polyisocyanurate foams which are able to achieve a Class 1 ASTM E-84 rating for fire retardancy and which has a low Smoke generation rating at densities over 2 pounds per cubic foot, with excellent physical and insulation properties and broad latitude as to processability would be a significant advance of the art.

SUMMARY OF THE INVENTION

It is a primary object of the present invention to provide rigid polyurethane (PU) and urethane modified polyisocyanurate (PIR) foams having an ASTM E-84 Class 1 rating as well as desirable physical and insulation properties which foams may be produced under a variety of processing conditions.

It is another object of the present invention to provide PU and PIR foams which do not require substantial amounts of costly specialty fire retardants to achieve the ASTM E-84 Class 1 rating.

Yet another object of the present invention is to provide PU and PIR foams which have the ASTM E-84 Class 1 rating both at foam densities above and below 2 pounds per cubic foot and at thicknesses above and below 2 inches.

Still another object of the present invention is to provide PIR foams which have an ASTM E-84 Class 1 rating at an NCO-index under 300 with low friability and low Flamespread and Smoke generation.

It is also an object of the present invention to provide foams which have a Flamespread value less than or equal to 25 and a Smoke generation value under 300 at a density of 2.4 pounds per cubic foot and a thickness of 2 inches when evaluated in accordance with ASTM E-84.

It is a further object of the present invention to provide a method for making such ASTM E-84 Class 1 rated foams.

These and other objects which will be apparent to those skilled in the art are accomplished by incorporating as the isocyanate-reactive component from about 25 to about 75%, preferably 40 to 75% (based on total isocyanate reactive component) of an oligoester in a polyurethane or a urethane modified polyisocyanurate foam formulation having an NCO index of under 300, preferably from about 200 to 250.

DESCRIPTION OF THE PREFERRED EMBODIMENTS OF THE INVENTION

The urethane modified polyisocyanurate foams of the present invention are reaction products of a polyisocyanate with an isocyanate-reactive component which includes 25 to 75 wt. %, preferably 40 to 75 wt. % (based on total isocyanate reactive component) of an oligoester having hydroxyl groups and at least 25 wt. % of a copolyol component formed in the presence of a blowing agent at an NCO Index below 300.

The isocyanate materials useful in the practice of the present invention include any of the aromatic polyisocyanates known in polyurethane chemistry, especially those which are liquid at room temperature. Aromatic polyisocyanates, especially those polyisocyanates which are based on 4,4'-diisocyanatodiphenylmethane (MDI) or its isomers are preferred. Suitable polyisocyanates of this type also include the polyphenyl polymethylene polyisocyanates which may be obtained by aniline-formaldehyde condensation followed by phosgenation (crude MDI). Also preferred are the derivatives of MDI, its isomers and crude MDI such as polyurethane prepolymers, carbodiimides, allophanates, etc., especially those which are liquid at room temperature, and mixtures thereof.

Liquid polyisocyanates containing urethane groups prepared from MDI, its isomers or crude MDI, but especially MDI such as those described in U.S. Pat. Nos. 3,644,457 and 4,544,679 are particularly preferred. These polyisocyanates containing urethane groups may be prepared by reacting one mol of MDI with from about 0.05 to 0.3 mols of low molecular weight diols or triols, preferably with polypropylene glycols having a molecular weight below 700. In addition to these mixtures of polyisocyanates and isocyanate-terminated prepolymers, any of the isocyanate-terminated prepolymers produced from an aromatic polyisocyanate known to those skilled in polyurethane chemistry are also polyisocyanates useful in the practice of the present invention.

The hydroxyl group-containing oligoesters useful in the practice of the present invention include any of those known in the art. Examples of such oligoesters are given in U.S. Pat. Nos. 3,943,164; 4,435,592; 4,452,997; 4,487,853; 4,535,178; 4,560,788 and 4,582,926. Preferred oligoesters include those formed by alkoxylating a dicarboxylic acid semi-ester and/or semi-amide with an alkylene oxide. The dicarboxylic acid semi-esters and/or semi-amides may be formed by reacting a dicarboxylic acid anhydride with a multivalent alcohol and/or dialkanolamine, preferably in a molar ratio of 1:0.5 to 1:1.5, more preferably 1:0.7 to 1:1.2. This reaction may be carried out at temperatures of from 80° to 150° C., preferably 90° to 130° C. These semi-esters and/or semi-amides are then alkoxylated in accordance with techniques known in the art. It is preferred that the alkoxylation be carried out in the presence of a catalyst which is an alkoxylation product of an alkylene oxide having at least three carbon atoms with ammonia, $C_2$-$C_6$ aliphatic diamines or piperazine, in which all NH groups are alkoxylated. The propoxylation products of ammonia, ethylene diamine, propylenediamine or hexamethylene diamine are preferred.

The oligoesters containing hydroxyl groups useful in the present invention generally have an OH number of from 200 to 600 mg KOH/g.

Dicarboxylic acid anhydrides useful in the production of such oligoesters include: maleic anhydride, itaconic acid anhydride, citraconic acid anhydride, succinic acid anhydride, glutaric acid anhydride, phthalic acid anhydride and tetrahydrophthalic acid anhydride. Maleic acid anhydride, phthalic acid anhydride and glutaric acid anhydride are preferred.

Multivalent alcohols which may be used to produce such oligoesters include: ethylene glycol, 1,2- and 1,3-propanediol, diethylene glycol, dipropylene glycol, tripropylene glycol, 1,3-pentanediol, 1,6-hexane diol, 1,4-3,6-dianhydrohexitol, glycerine, trimethylol ethane, trimethylol propane, 1,2,6-hexanetriol, α-methylglycoside, pentaerythritol and sorbitol. Ethylene glycol, diethylene glycol, propylene glycol, trimethylol propane, glycerine and sorbitol are preferred. Multivalent alcohols having functionalities greater than 2 may be used alone or in combination with a diol.

Alkanolamines useful in producing the oligoesters employed in the present invention include: N-methylethanolamine, N-ethylethanolamine, N-butylethanolamine and dialkanolamines such as diethanolamine, dipropanolamine and dibutanolamine.

Catalysts useful in the production of these oligoesters include the alkoxylation products of an alkylene oxide having at least three carbon atoms (preferably propylene oxide) and an amine such as any of the commercially available ethylene diamines, propylene diamines and hexamethylene diamines: Propoxylation products having from 4 to 12 mols of propylene oxide per mol of diamine are preferred, particularly those in which substantially all of the NH groups are propoxylated.

The alkylene oxides useful for alkoxylation of the carboxyl groups of the semi-ester and/or semi-amide include ethylene oxide, propylene oxide and mixtures thereof.

In one preferred method for the production of these oligoesters, the dicarboxylic acid semi-ester and/or the dicarboxylic acid semi-amide is (are) first produced from a multivalent alcohol and/or dialkanolamine and a cyclic dicarboxylic acid anhydride at a temperature of from 50° to 150° C., preferably 90° to 130° C., and reaction times of 1 to 10 hours, preferably 2 to 4 hours. The cyclic dicarboxylic acid anhydrides are reacted with the multivalent alcohols and/or dialkanolamines at a mol ratio of 1:0.5 to 1.5, preferably 1:07 to 1.2. The thus-obtained dicarboxylic acid semi-esters and/or semi-amides are then reacted in the presence of 0.5 to 5 pbw of an alkoxylated amine catalyst with ethylene oxide and/or propyleneoxide in a quantity such that the equivalent ratio of acid groups to alkylene oxides is from 1:0.8 to 1.7, preferably 1:1.0 to 1.6. The alkoxylation is generally carried out at temperatures of 80° to 150° C., preferably 90° to 130° C. Acid numbers of less than 10 are desirable. The amount of alkylene oxide is selected so that after the described reaction conditions are applied, no or very little free alkylene oxide is present. Any trace of free alkylene oxide present is distilled off under reduced pressure. Some of the applied cyclic dicarboxylic acid anhydrides tend to sublimate at the temperature required for ring opening. For this reason the propoxylated amine is preferably used during ring opening, so that more rapid semi-ester formation at low temperatures is achieved.

In addition to the use of an oligoester which is required in the present invention, the copolyol component may be any of the conventional isocyanate reactive materials known to those skilled in the art. Such copolyols may be used in an amount of from 25 wt. % to 75 wt. % of the total of isocyanate-reactive materials.

Appropriate isocyanate-reactive compounds include compounds with at least two hydrogen atoms that are reactive toward isocyanates having a molecular weight generally of 400 to 10,000. Compounds that contain amino groups, thio groups or carboxyl groups as well as compounds that contain hydroxyl groups may be used. Compounds which contain hydroxyl groups, particularly compounds that contain 2 to 8 hydroxyl group, specifically those having a molecular weight of 400 to 6000, preferably 600 to 4000 are preferred. Polyesters, polyethers, polythioethers, polyacetals, polycarbonates and polyesteramides having 2 to 4 hydroxyl groups known to be useful in the production of homogeneous and cellular polyurethanes (described e.g., in U.S. Pat. No. 4,544,679) are among the more preferred isocyanate-reactive materials. Particularly preferred are polyethers which are obtained through the addition of one or more alkyleneoxides (ethylene oxide and particularly propylene oxide) or bi- or multivalent "starters" such as propylene glycol, glycerine, sorbitol, formose, saccharose, triethanolamine or trimethylol propane. Polyethers which contain polyaddition products of diisocyanates and hydrazine and/or diamines and/or glycols or polymers and/or graft polymers (preferably of styrene or acrylonitrile) in dispersed or dissolved form are also preferred. These polyethers generally have an average functionality of more than 2.0.

Surfactants are typically employed in the preparation of rigid foams of the urethane and isocyanurate type. Silicone fluids which improve the cell size and uniformity of the foam are among the most commonly used surfactants. One particular surfactant which has been successfully employed in the practice of the present invention is a silicone fluid manufactured by Goldschmidt available under the designation Tegostab B-8404.

Any known catalyst for the reaction of isocyanate groups with hydroxyl groups may be used in the practice of the present invention. Such catalyst may be used alone or together with a catalyst for the isocyanurate ring formation reaction to produce foams in accordance with the present invention. Any catalyst which is capable of catalyzing the simultaneous urethane and isocyanurate reactions may also be used. Trimer catalysts such as DMP-30 (a dimethylaminomethyl substituted phenol available from Rohm & Haas) and Potassium Hex-Cem 977 (a potassium octoate available from Mooney Chemicals) admixed with dimethylaminoethanol a tertiary amino urethane catalyst manufactured by Rhein-Chemie (9/1 ratio by weight) are preferred catalysts.

Conventional polyurethane foam blowing agents are used in the preferred embodiment of the present invention. Vaporizable liquid halogenated hydrocarbons such as trichlorofluoro-methane are preferred. Fire retardant agents such as the known phosphate flame retardants (e.g. Fyrol PCF available from Stauffer Chemicals Co.) and tris-chloropropyl phosphates may also be employed in the present invention.

Solubilizers, like Igepal Co 630 (an alkylphenoxy polyol(oxyethylene) ethanol available from GAF Corporation), may also be included in the blend of isocyanate-reactive materials.

In accordance with the present invention, the isocyanate and isocyanate-reactive components may be reacted together by the known one-shot process, prepolymer process or semi-prepolymer process, in many cases using mechanical devices, such as those described in U.S. Pat. No. 2,764,565. Details about processing apparatus which may also be used according to the present invention may be found in Kunststoff-Handbuch, Volume VII, published by Vieweg and Hoechtlen, Carl-Hanser Verlag, Munich 1966, for example on pages 121 to 205.

The present invention is not to be limited to the foregoing specific examples of suitable isocyanates, surfactants, catalysts, blowing agents, fire retardants or polyols. Any of the large number of materials available from a variety of suppliers for use in polyurethane foam manufacture may be substituted for the specifically identified materials by one skilled in the art and are deemed to fall within the teachings of the present invention.

The following examples illustrate the urethane modified polyisocyanurate foams of the present invention.

EXAMPLES

Systems, E, F and G in which a mixture of a specified copolyol and a specified oligoester was used as the isocyanate-reactive component illustrate systems suitable for the practice of the present invention. Systems A to D illustrate comparative foams made with the known DMT, PET or PAA based polyester polyols instead of the oligoester polyol of the present invention.

In each of these Examples, the isocyanate, polyester or mixtures of oligoester and polyol were reacted in quantities such that the isocyanate/polyol ratio corresponded to a 250 index to form urethane modified polyisocyanurate foams. Trichlorofluoromethane was used as the blowing agent.

Each of the Systems A through G was processed with a high pressure machine (type HK 100 sold by Mobay Corporation) on a continuous conveyor. The chemicals were at a temperature of 21° C. prior to processing in the conveyor which was maintained at a temperature of 52° C.

A Class 1 foam in accordance with ASTM E-84 must have a Flamespread value $\leq 25$ and a Smoke generation value of $<450$.

The materials used in the Examples were as follows:

POLYESTER A: Dimethylterephthalate residue based polyester from Hercules, Inc. having an average molecular weight of 400 and hydroxyl number of 320 sold under the designation Terate 203.

POLYESTER B: Polyethylene terephthalate residue based polyester from Freeman Chemical Corporation having an average molecular weight of 340 and a hydroxyl number of 350 sold under the designation Freol 37-2508.

POLYESTER C: Phthalic anhydride based polyester from Mobay Corporation having an average molecular weight of 310 and a hydroxy number of 340 sold under the designation Multron E-624.

POLYESTER D: Phthalic anhydride based polyester from Stepan Chemical Company having an average molecular weight of 340 and a hydroxyl number of 315 sold under the designation of Stepanpol X 3152.

POLYETHER A: Sucrose based polyether from Mobay Corporation having an average molecular weight of 625 and a hydroxy number of 470 sold under the designation Multranol 4034.

POLYETHER B: Glycerine based polyether from Mobay Corporation, having an average molecular weight of 160 and a hydroxyl number of 1050.

SOLUBILIZER: The solubilizer used in each of the formulations was an alkylphenoxypoly(oxyethylene) ethanol solubilizer having a hydroyxyl number of 91 and available from GAF under the designation Igepal Co 630.

FLAME RETARDANT: The flame retardant used in each of the formulations was the phosphate flame retardant sold under the designation Fyrol PCF by Stauffer Chemical Co.

SURFACTANT: The surfactant used in each of the exemplified formulations was a silicone material sold by Goldschmidt under the designation Tegostab-B-8404.

ADDITIVE 1132: A phthalic anhydride/diethylene glycol adduct (1:3 molar ratio) having an average molecular weight of 466 and a hydroxyl number of 790 available from Bayer AG.

CATALYST A: Catalyst blend of 90 weight % Potassium Hex-Cem 977 (available from Mooney Chemicals) and 10 weight % dimethylaminoethanol (available from Rhein-Chemie) having an hydroxyl number of 350.

CATALYST B: A dimethylaminomethyl-substituted phenol catalyst having a hydroxyl number of 212 available from Rohm & Haas under the designation DMP-30.

POLYISOCYANATE A: A polymethylene polyphenyl polyisocyanate having an NCO content of 31–32% sold by Mobay Corporation under the designation Mondur MR.

POLYISOCYANATE B: A polymethylene polyphenyl polyisocyanate having an NCO content of 31–32% sold by Mobay Corporation under the designation Mondur 489.

OLIGOESTER A: An oligoester based on phthalic anhydride, diethylene glycol and ethylene oxide having a hydroxyl number of 307, an acid number of 0.8, a viscosity at 25° C. of 7000 cps and a free glycol content of 7% which is sold by Bayer AG under the designation Desmophen VP PU 1431.

| COMPARATIVE RESIN FORMULATIONS IN WEIGHT % | | | | |
|---|---|---|---|---|
| Formulation Number | 1 | 2 | 3 | 4 |
| POLYESTER A | 50.62 | | | |
| POLYESTER B | | 50.36 | | |
| POLYESTER C | | | 49.06 | |
| POLYESTER D | | | | 50.51 |
| POLYETHER A | 20.25 | 20.14 | 19.62 | 20.20 |
| SOLUBILIZER | 7.01 | 6.97 | 6.79 | 6.99 |
| FLAME RETARDANT | 15.11 | 15.49 | 15.85 | 14.76 |
| SURFACTANT | 2.34 | 2.32 | 2.26 | 2.33 |
| POLYETHER B | — | — | 1.51 | — |
| ADDITIVE 1132 | 1.51 | 1.50 | 1.89 | 1.48 |
| CATALYST A | 2.38 | 2.38 | 2.26 | 2.80 |
| CATALYST B | 0.79 | 0.79 | 0.75 | 0.98 |

| INVENTIVE RESIN FORMULATIONS IN WEIGHT % | | |
|---|---|---|
| Formulation Number | 5 | 6 |
| OLIGOESTER A | 50.88 | 45.11 |
| POLYETHER A | 20.35 | 26.44 |
| SOLUBILIZER | 7.05 | 6.22 |
| FLAME RETARDANT | 14.87 | 15.17 |
| SURFACTANT | 2.35 | 2.33 |
| ADDITIVE 1132 | 1.50 | 1.56 |
| CATALYST A | 2.25 | 2.38 |
| CATALYST B | 0.75 | 0.79 |

| | COMPARATIVE SYSTEMS | | | |
|---|---|---|---|---|
| | SYSTEM A | SYSTEM B | SYSTEM C | SYSTEM D |
| Resin, pbw | 100 Form. #1 | 100 Form. #2 | 100 Form. #3 | 100 Form. #4 |
| Polyisocyanate A, pbw | 171 | — | 184 | 166 |
| Polyisocyanate B, pbw | — | 180 | — | — |
| Blowing Agent, pbw | 30 | 31 | 33 | 28 |
| Cream time, sec/ | 14 | 13 | 13 | 12 |
| Gel time, sec/ | 39 | 39 | 36 | 40 |
| Core density, pcf (ASTM D-1622) | 2.4 | 2.4 | 2.6 | 2.3 |
| Foam thickness, inches | 2 | 2 | 2 | 2 |
| Flamespread (ASTM E-84) | 25 | 30 | 25 | 30 |
| Smoke generation (ASTM E-84) | 185 | 215 | 560 | 300 |
| Friability, % weight loss, (ASTM C-421) | 12 | 16 | 10 | 12 |
| Foam comp. strength at 10% deflection, psi (ASTM D-1621) | | | | |
| parallel | 32 | 31 | 22 | 30 |
| perpendicular | 24 | 23 | 20 | 20 |
| Foam tens. strength, psi (ASTM D-1623) | | | | |
| parallel | 25 | 26 | 26 | 52 |
| perpendicular | 29 | 30 | 23 | 29 |
| Dim. stability, % Volume change, 28 days (ASTM D-2126) | | | | |
| at 70° C., 100% RH | 4.4 | 4.0 | 10.7 | 5.8 |
| at 100° C. | 1.4 | 1.3 | 7.4 | 2.6 |
| Initial k-factor BtU in./hr. ft$^2$ °F. (ASTM C-518) | 0.107 | 0.135 | 0.116 | 0.123 |

| | INVENTIVE SYSTEMS | | |
|---|---|---|---|
| | SYSTEM E | SYSTEM F | SYSTEM G |
| Resin, pbw | 100 Form. #5 | 100 Form. #6 | 100 Form. #5 |
| Polyisocyanate A | 168 | 195 | — |
| Polyisocyanate B, pbw | — | — | 170 |
| Blowing Agent, pbw | 30 | 33 | 26 |
| Cream time, sec. | 13 | 17 | 13 |
| Gel time, sec. | 39 | 41 | 39 |
| Core density, pcf (ASTM D-1622) | 2.4 | 2.5 | 2.4 |
| Foam thickness, inches | 2 | 2 | 4 |
| Flamespread (ASTM E-84) | 25 | 25 | 25 |
| Smoke generation (ASTM E-84) | 240 | 230 | 365 |
| Friability, % weight loss (ASTM C-421) | 8 | 15 | 14 |
| Foam comp. strength at 10% deflection, psi (ASTM D-1621) | | | |
| parallel | 26 | 23 | 38 |
| perpendicular | 23 | 26 | 25 |
| Foam tens. strength psi (ASTM D-1623) | | | |
| parallel | 38 | 45 | 54 |
| perpendicular | 42 | 35 | 45 |
| Dim. stability, % volume change, 28 days (ASTM D-2126) | | | |
| at 70° C., 100% RH | 7.8 | 5.6 | 6.5 |
| at 100° C. | 2.8 | 2.3 | 2.6 |
| Initial k-factor, BtU in./hr. ft$^2$ °F. (ASTM C-518) | 0.122 | 0.130 | 0.126 |

System A represents a urethane modified polyisocyanurate foam with good properties which are attributable to the dimethylterephthalate residue polyester polyol. The improvement of combustibility performance achieved by use of such residue in accordance with ASTM E-84 test over foams based on polyols produced without such residue polyester is known. However, these residue based polyester polyols do have a severe disadvantage with respect to product consistency. This inconsistency has a significantly negative impact on the processing of such residue to produce foams on a commercial basis.

The superiority of residue polyester polyols over the conventional aromatic polyesters with respect to fire retardance is apparent from systems C and D in which the residue polyester polyol was replaced with conventional polyesters derived from refined raw materials. Foams of System C and D do not have ASTM E-84 Class 1 ratings. The foam of System C had a Smoke generation of 560 and the foam of System D had a Flamespread of 30 when evaluated in accordance with ASTM E-84. The use of a residue polyester polyol does not however guarantee ASTM E-84 Class 1 performance. This is evident from the foam of system B which had a Flamespread of 30 in the ASTM E-84 test even though it was based on a high functionality polymeric isocyanate (which normally improves the fire retardance of a foam).

In contrast, foams made from the inventive systems E and F have the desirable good properties, i.e. properties which are comparable to those of foams from system A. The oligoester required in the present invention is not however based on residues like the polyester polyols from the comparative Systems A and B, but on refined raw materials as the aromatic polyesters from the comparative Systems C and D. Therefore, it was not to be expected that such excellent ASTM E-84 Class 1 ratings could be obtained with such oligoesters. The foam from System F had 10% less ester content compared to the foam of System A. Additionally, the oligoester used in the inventive system allowed production of foams with good ASTM E-84 Class 1 ratings at a thickness as high as 4 inches as was demonstrated in System C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

2. The foam of claim 1 in which the foam has a density of 2.4 pounds per cubic foot and is at least two inches thick.

3. The foam of claim 1 in which the polyisocyanate and obligoester have been reacted in quantities such that the isocyanate index was between 200 and 250.

4. The foam of claim 1 in which the oligoester (b) was 40–75 wt. % of mixture of the isocyanate-reactive materials used.

5. The foam of claim 1 in which the oligoester was formed by reacting phthalic anhydride with diethylene glycol in a molar ratio of 1:0.5 to 1:1.5 and then reacting the product with ethylene oxide in the presence of a propoxylated amine catalyst at an equivalent ratio of acid groups to ethylene oxide groups of from 1:08 to 1:1.7.

1. A rigid flame retardant foam having an ASTM E-84 Class 1 rating which is the reaction product, formed at an isocyanate index of less than 300, of
   (a) an organic polyisocyanate;
   (b) an isocyanate-reactive mixture comprising
      (i) 25–75 weight % (based on total isocyanate-reactive materials) of an oligoester, wherein said oligoester is the reaction product of a dicarboxylic acid semi-ester or semi-amide and an alkylene oxide, said reaction product being formed in the presence of a catalyst, wherein said catalyst is the N-alkoxylation product of an alkylene oxide of at least three carbon atoms with ammonia, a $C_2$–$C_6$ aliphatic diamine, or piperazine, and
      (ii) at least 25 weight % of an isocyanate-reactive compound different from oligoester (b)(i); and
   (c) a blowing agent.

6. The foam of claim 1 in which the dicarboxylic acid semi-ester or semi-amide is the reaction product of a dicarboxylic acid anhydride and a multivalent alcohol or dialkanolamine.

7. The foam of claim 1 in which the dicarboxylic acid semi-ester is the reaction product of phthalic anhydride and diethylene glycol and the alkylene oxide is ethylene oxide.

* * * * *